United States Patent [19]
Cumpson et al.

[11] Patent Number: 5,761,012
[45] Date of Patent: Jun. 2, 1998

[54] COMBINATION OF A MAGNETIC RECORD CARRIER AND AN APPARATUS FOR RECORDING A DIGITAL INFORMATION SIGNAL IN A TRACK ON SAID RECORD CARRIER

[75] Inventors: Stephen R. Cumpson, Eindhoven, Netherlands; Steven E. Stupp, Mountain View, Calif.

[73] Assignee: U.S. Philips Corporation, New York, N.Y.

[21] Appl. No.: 741,617

[22] Filed: Oct. 31, 1996

Related U.S. Application Data

[63] Continuation of Ser. No. 698,399, Aug. 15, 1996.

[51] Int. Cl.$^6$ .................................................. G11B 5/23
[52] U.S. Cl. ............................................................ 360/119
[58] Field of Search ................................. 360/119, 121, 360/122

[56] References Cited

U.S. PATENT DOCUMENTS 4,979,051 12/1990 Eggebeen ..................... 360/121 X

FOREIGN PATENT DOCUMENTS 2265011a 10/1990 Japan.

*Primary Examiner*—John H. Wolff
*Attorney, Agent, or Firm*—Michael E. Belk

[57] ABSTRACT

A combination is disclosed of a magnetic record carrier and an apparatus for recording a digital information signal in a track on the record carrier. The apparatus includes an input terminal for receiving the digital information signal, an encoding unit for encoding the digital information signal so as to obtain a digital channel signal suitable for recording, and a writing unit for writing the digital channel signal in the track on the record carrier. The writing unit includes at least one write head having a specific gap width. The apparatus is adapted to write the digital channel signal in the record carrier with a bit-length which is smaller than 0.25 µm, and the record carrier has an oblique easy-axis angle between 30° and 42° with regard to the longitudinal direction of the track and in a plane perpendicular to the record carrier.

17 Claims, 2 Drawing Sheets

COMBINATION OF A MAGNETIC RECORD CARRIER AND AN APPARATUS FOR RECORDING A DIGITAL INFORMATION SIGNAL IN A TRACK ON SAID RECORD CARRIER

This application is a continuation of co-pending application Ser. No. 08/698,399 (PHN 15,559) filed Aug. 15, 1996.

BACKGROUND OF THE INVENTION

1. Field of the Invention

The invention relates to the field of digital magnetic recording and reproduction and especially to recording of computer data.

The invention relates to a combination of a magnetic record carrier and an apparatus for recording a digital information signal in a track on said record carrier, the apparatus includes input apparatus for receiving the digital information signal,
encoding apparatus for encoding the digital information signal so as to obtain a digital channel signal suitable for recording,
writing means for writing the digital channel signal in the track on the record carrier, the writing means comprising at least one write head having a specific gap width, the apparatus being adapted to write the digital channel signal in the record carrier, with a bit-length which has a specific value, to an apparatus and a record carrier for use in the combination. A combination as defined in the opening paragraph is known from EP-A 18,267. Those skilled in the art are directed to: J. C. Mallinson, "Proposal Concerning High-Density Digital Recording", IEEE Trans. on Magn., vol. 25, pp. 3168–3169 (1989); J. P. C. Bernards et al, "Vector magnetization of recording media: A new method to compensate for demagnetising fields", IEEE Trans. on Magn., vol 27, no. 6, pp. 4873–4875 (1991); H. A. J. Cramer, "On the hysteresis and the recording process in magnetic media", Thesis, University of Twente (NL), Oct. 29, 1993; R. L. Wallace, "The reproduction of magnetically recorded signals", BSTJ, 30, p. 1145 (1951). All the above citations are hereby incorporated in whole by reference.

SUMMARY OF THE INVENTION

The invention aims at providing an improved combination which enables higher recording densities and lower bit error rates.

The combination in accordance with the invention is characterized in that the apparatus is adapted to write the digital channel signal in the record carrier with a bit-length which is smaller than 0.25 μm and that the record carrier has an oblique easy-axis angle between 30° and 42° with regard to the longitudinal direction of the track and in a plane perpendicular to the record carrier.

The invention is based on the following recognition. The read process in magnetic recording (using inductive heads, or magneto-resistive heads which are not saturated) is linear. The write process is non-linear. Fortunately, for a wide range of linear recording densities (defined as the inverse of the recording bit-length) the write process is pseudo-linear. This means that the locations of magnetic transitions recorded in a medium using a write signal $f=f_1+f_2$ (where $f_1$ and $f_2$ are two separate write signals) are the same as those found by linear superposition of the results for write signal $f_1$ and $f_2$ when they are written separately. The recording channel is thus linear along the time axis. The amplitude of the output signals for write current $f=f_1+f_2$, however, are not simply the linear superposition of the amplitudes for recording using $f_1$ and $f_2$ separately (thus the channel is pseudo-linear). This pseudo-linearity is critical because in combination with the linear read process it allows the development, and use, of linear equalizers in the read process (which correct for channel imperfections and reduce inter symbol interference in the detection process). As the linear recording density is increased (by decreasing the bit-length) the magnetic transitions start to interact with one another (through their demagnetizing fields) in the recording process. The channel is no longer pseudo-linear. The leading order impact of this non-linear interaction between recorded transitions is a non-linear bit shift of the transition location of the bit currently being written. This will adversely affect the system bit-error-rate since this non-linear shift will not be corrected by the linear read equalization.

Other sources of non-linearities include a finite rise time of the field in the gap of the magnetic head or a DC content in the write current pattern, in combination with a system using a transformer, for example. These sources will however not be discussed any further.

There are some systems solutions for non-linear bit shifts. For example they can be compensated for using write equalization by time shifting the transitions in the write current pattern appropriately. This entails some expense in terms of electronics. Write equalization compensation must operate in real time. This requires fast electronics since these circuits must operate at several times the bit frequency.

In accordance with the invention, a record carrier having substantially no non-linear bit shift is required. With a record carrier as claimed, and for recording densities as defined above, such situation can be obtained, so that relatively higher bit densities with relatively lower bit error rates can be achieved.

It should be noted that J. C. Mallinson, "Proposal Concerning High-Density Digital Recording", IEEE Trans. on Magn., vol. 25, pp. 3168–3169 (1989), has predicted that for an oblique easy-angle (between 0°, longitudinal, and 90°, perpendicular) the non-linear bit shift will be zero. No indication has been given, however, how an appropriate oblique easy-axis angle for the record carrier should be chosen, depending on the bit density of the information signal to be recorded on the record carrier.

It should further be noted that J. P. C. Bernards et al, in "Vector Magnetisation of Recording Media: A New Method to Compensate for Demagnetising Fields", IEEE Trans. on Magn., vol 27, No. 6, pp 4873–4875 (1991) discloses a method to correctly measure the oblique easy axis angle of a magnetic medium.

BRIEF DESCRIPTION OF THE DRAWINGS

These and other aspects of the invention will be apparent to those skilled in the art of digital magnetic recording, from and further elucidated with reference to the embodiments described hereafter in conjunction with the drawings, in which.

DESCRIPTION OF THE PREFERRED EMBODIMENTS

Figure 1A:
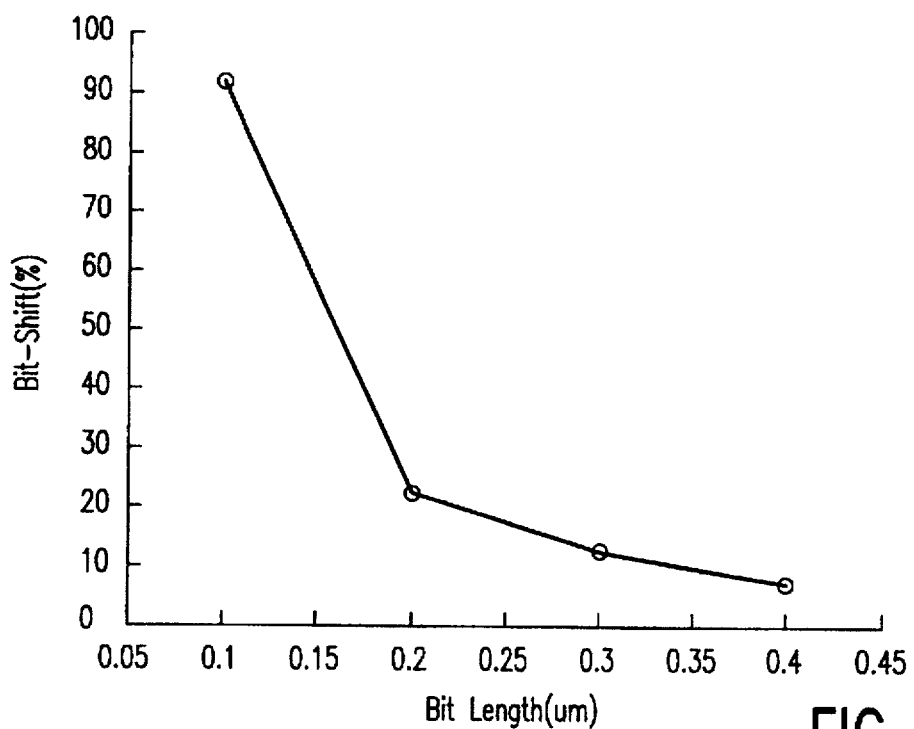
FIG. 1a shows the measured non-linear bit shift as a function of the bit-length.
Figure 1B:
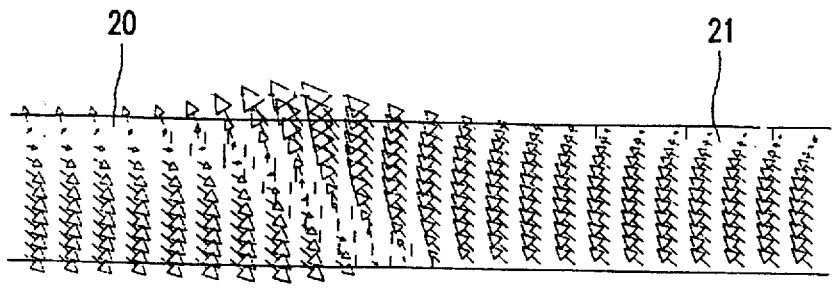
FIG. 1b shows the magnetic field (i.e., magnetization) in a magnetic medium, obtained from computer simulations.

FIG. 1 shows the measured non-linear bit shift of a Metal Evaporated (ME) tape having an specific oblique easy-axis angle (as an example, 35° from the longitudinal direction). FIG. 1a shows the behaviour of the non-linear bit shift (change in transition location $\Delta x$ divided by the bit-length b) in percent as a function of the bit-length b in μm. The bit-length is to be understood as the shortest distance between flux-reversals in the magnetic material of the record carrier.

On decreasing the bit-length by 20%, from 0.25 μm (a value appropriate for a present day standardized Digital Video Cassette system), to 0.2 μm (a value which might be of use in future, digital recording systems having a higher density), the bit shift increases about 25% from a value of approximately 17% to 21%. It should thus be concluded that in present day recording systems, where the bit-length is relatively large, non-linear bit shift has not been recognized as a problem, for the reason that the non-linear bit shift is low. For future recording systems, however, with higher bit densities, non-linear bit shift will become a problem, and a solution to this problem is required. In accordance with the invention, this solution is found in choosing an appropriate value for the easy-axis angle of the recording medium.

Computer simulations using a well tested self consistent numerical model have been carried out to investigate the behaviour of the non-linear bit shift as a function of the easy-axis angle of a magnetic record carrier in a recording system where contact recording has been applied. Compared to earlier computer simulations carried out on a modelled version of a magnetic layer, a more refined calculation has been carried out, using smaller elementary units in the model and by calculating the magnetic field deeper within the magnetic layer. This was necessary, since the surface of a magnetic layer can suffer appreciable overwrite from the trailing edge of the recording head, resulting in a significantly different magnetisation field in the top layer of the magnetic medium compared to layers deeper in the medium. This is explained with reference to FIG. 1b, which shows the magnetisation in the magnetic layer of evaporated metal of the medium at the location of a flux reversal in the magnetic medium. The direction of magnetisation, given by the arrows in the figure, is in the direction of the easy axis angle of the medium, where the length of the arrows corresponds to the strength of the magnetisation. The magnetic field was written in the magnetic medium by means of a magnetic head scanning the medium from the top side. Special attention should be paid to the surface portions indicated by the reference numerals 20 and 21 in FIG. 1b. The magnetic field in these portions is quite different from the magnetic field more deeper in the medium. So, not taking into account the magnetic field deeper in the layer will lead to unreliable results from computer simulations.

The improvement to the calculations further required the introduction of an exponential spacing loss factor that describes the influence of regions of the magnetic layer further from the magnetic head. This approach is well known in the theory of magnetic recording, see R. L. Wallace, "The Reproduction of Magnetically Recorded Signals" BSTJ, 30, p. 1145 (1951).

Figure 2:
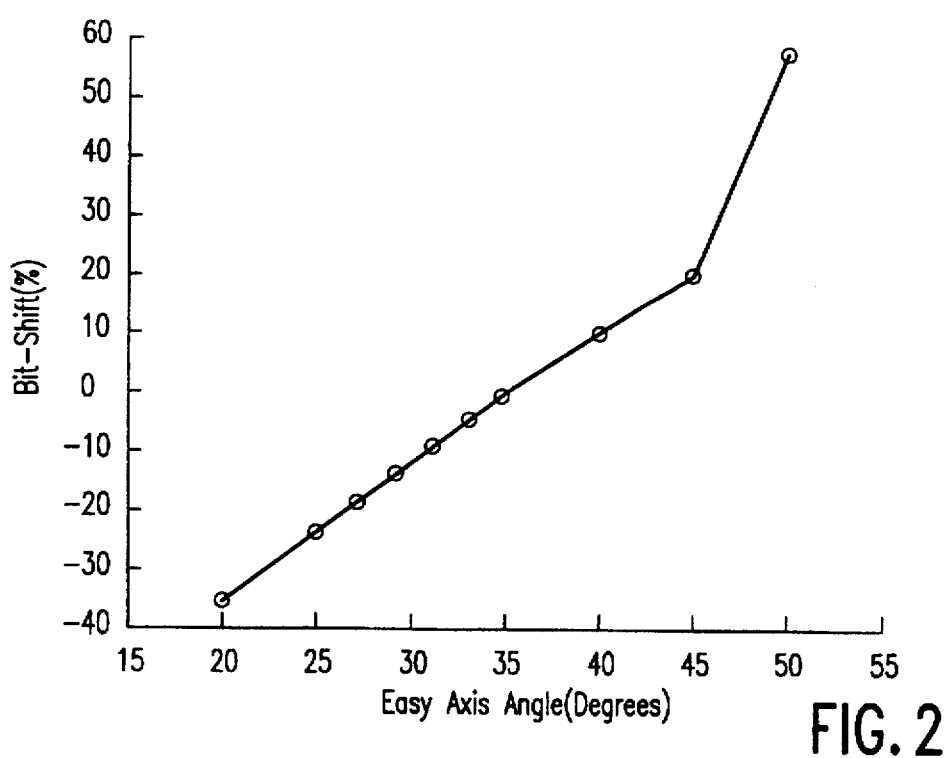
FIG. 2 shows the calculated behaviour of the non-linear bit shift as a function of the easy-axis angle.

FIG. 2 shows the behaviour of the non-linear bitshift, where the bit-length b of the information recorded on the record carrier equals 0.2 μm and the write head has a gap width g of 0.25 μm. The easy-axis angle for a substantially zero non-linear bit shift is roughly 36°, with a margin of eg. ±1°. For a description of the self consistent numerical model, reference is made to the dissertation of H. A. J. Cramer, "On the Hysteresis and the Recording Process in Magnetic Media", Thesis, University of Twente (NL), Oct. 29, 1993.

Figure 3:
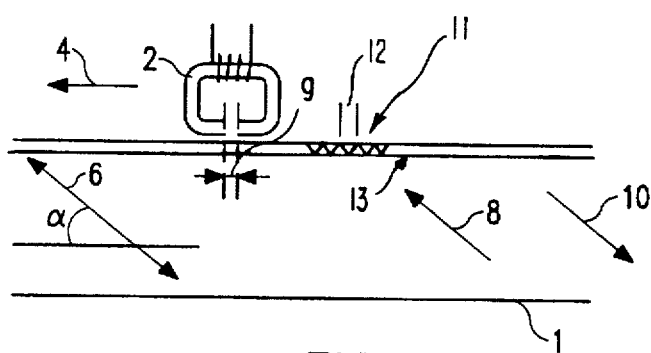
FIG. 3 shows a cross sectional view of the record carrier and the write head.

FIG. 3 shows a cross sectional view of the record carrier 1 and the write head 2, when recording information in the record carrier. The arrow 4 in the figure indicates the direction of movement of the head 2 relative to the record carrier 1. The cross section is along the direction of movement of the head relative to the record carrier and perpendicular to the record carrier. The head 2 has a gap width g and bits 11 of information are recorded with length 12 in the evaporated metal layer 13 of the record carrier. The writing of bits of information in the record carrier results in magnetization patterns in the record carrier. The angle α in FIG. 3 shows the easy-axis angle of the magnetic medium. More specifically, the preferred direction of magnetization is the direction of the arrow 6. A 'one' bit could result in a magnetization given by the arrow 8, whereas a 'zero' bit could result in a magnetization given by the arrow 10.

Note that the bit shift in FIG. 2 is a very sensitive function of the easy-axis angle. Varying the easy-axis angle around the optimum value of 36° leads to a rapid change in the bit shift. There exists, therefore, a very well defined optimum value, for particular ME tape properties (the value of the optimum easy-axis angle will be different for an ME tape with different properties). This optimum value is also function of the system geometry. For example Table I shows the calculated impact of varying the write head gap width g, while holding the field over the head gap $H_g$=440 kA/m (which maximizes the output signal at a read wavelength of 1 μm), and the easy-axis angle α=36° fixed. Changing g by ±20% has the same impact as changing the easy-axis angle by ±2° around the optimum point. The point is that for a given system and ME tape, there exists an optimal easy-axis angle where the non-linear bit shift is zero.

TABLE I

The calculated bit shift as a function of the write head gap g for an easy-axis angle α of 36°, a bit-length b of 0.2 μm, and the field over the head gap $H_g$ of 440 kA/m.

| Write Gap g (μm) | Calculated Bit shift (%) |
| --- | --- |
| 0.2 | −2.3 |
| 0.25 | +0.05 |
| 0.3 | +4.1 |

One could conclude from the table that for a gap width of 0.2 μm, the non-linear bit shift would become quite large. By using a record carrier with a slightly different oblique easy-axis angle, the non-linear bit shift will again be substantially zero. Such change in the value of the oblique easy axis angle can be small, eg. within one degree, as the dependency of the non-linear bit shift from the oblique easy axis angle is rather strong, see FIG. 2.

Investigations have resulted in the knowledge that in future systems which will have smaller bit-lengths than presently used, which use an arbitrarily chosen media (ME or Metal Particle MP), will experience significant increases in non-linear bit shift. In accordance with the present invention, a solution has been found for future systems (with a given bit-length b, gap width g, and the standard contact recording based configuration using in magnetic recording systems) to use such (ME) tapes that substantially no non-linear bit shift occurs. Appropriate record carrier magnetic materials for ME tapes are Co—O and Co—Ni—O based materials.

Figure 4:
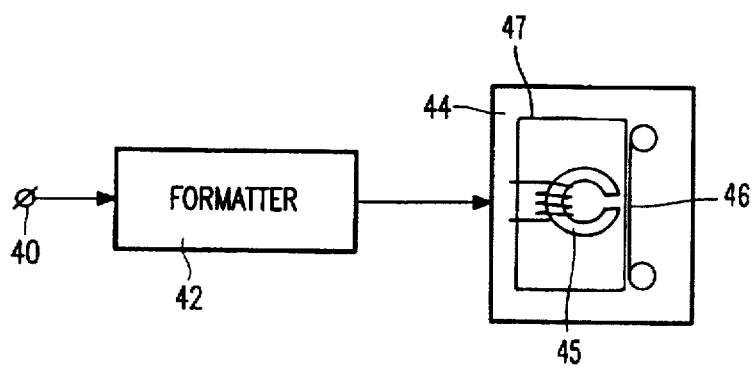
FIG. 4 shows an embodiment of the recording apparatus.

FIG. 4 shows an embodiment of the recording apparatus. The apparatus has an input terminal 40 for receiving the information signal to be recorded. The input terminal 40 is coupled to an input of a formatter unit 42, an output of which is coupled to an input of a write unit 44. The formatter unit 42 encodes the information signal such that the encoded signal is suitable for recording in the magnetic record carrier. The formatter unit 42 may thus include a channel encoder, well known in the art, for channel encoding the information signal. The write unit 44 comprises at least one write head 45, for writing the channel signal in a track on the record carrier 46. The write head 45 has a gap width g which is smaller than 0.25 μm, more specifically, smaller than 0.20 μm. The apparatus 47 is adapted to write the channel signal in the record carrier such that the bit-length of the signal written in the record carrier is smaller than 0.25 μm. This can be realized by a specific processing speed in the formatter unit and by choosing a specific speed of the head 45 relative to the record carrier 46 during recording.

The easy-axis angle of the record carrier is between 30° and 42°. More specifically, the easy-axis angle lies between 33° and 39°. A preferred value for the easy-axis angle is substantially 36°.

The present invention allows a simple modification in medium property, more specifically, the easy-axis angle of the medium, to move the non-linearity threshold to higher linear bit densities.

In the foregoing, the description has remained silent about the possibility that the write head may have a write gap positioned at a specific azimuth angle compared to the direction of movement of the write head relative to the record carrier. In such a situation, the gap width is defined as the width of the gap viewed in the said direction of movement of the head and the bit-length is defined as the shortest distance between flux reversals on the record carrier, viewed in the longitudinal direction of the track.

Whilst the present invention has been described with respect to preferred embodiments thereof, it is to be understood that these are not limitative examples. Thus various modifications may become apparent to those skilled in the art, without departing from the scope of the invention, as defined in the appended claims. As a consequence, the record carrier may be in the form of a longitudinal record carrier (tape) or in disk form (hard or floppy disks). Further, the recording process may be implemented using contact recording, however, also a non-contact recording process is possible.

A recording apparatus in accordance with the invention may now be devoid of any write equalization means for time shifting the transitions in the write current.

We claim:

1. A useful combination comprising of:
a magnetic record carrier with an oblique easy-axis between 30° and 42° with regard to the longitudinal direction of a track and in a plane perpendicular to the record carrier; and
an apparatus operative for recording a digital information signal into the track on the record carrier, including:
input means for receiving the digital information signal;
encoding means for encoding the digital information signal so as to obtain a digital channel signal suitable for recording;
writing means including at least one write head having a gap, for writing the digital channel signal onto the track of the record carrier with a bit-length which is smaller than 0.25 μm and the oblique easy-axis between 30° and 42°.

2. Apparatus useful for recording a digital information signal into a track on a record carrier, comprising:
input means for receiving the digital information signal;
encoding means for encoding the digital information signal so as to obtain a digital channel signal suitable for recording;
writing means including at least one write head having a gap, for writing the digital channel signal onto the track of the record carrier with a bit-length which is smaller than 0.25 μm and a non-linear bit shift of less than 18%.

3. Apparatus useful for recording a digital information signal into a track on a record carrier, comprising:
input means for receiving the digital information signal;
encoding means for encoding the digital information signal so as to obtain a digital channel signal suitable for recording;
writing means including at least one write head having a gap, for writing the digital channel signal onto the track of the record carrier with a bit-length which is smaller than about 0.25 μm and an oblique easy-axis angle between 30° and 42° with regard to the longitudinal direction of the track and in a plane perpendicular to the record carrier.

4. The apparatus of claim 3, in which the width of the gap of the write head is smaller than 0.25 μm.

5. The apparatus of claim 4, in which:
the width of the gap of the write head is smaller than 0.20 μm;
the writing means are adapted to write the digital channel signal onto the track of the record carrier with a bit-length smaller than 0.20 μm;
the apparatus further comprises a record carrier with an oblique easy-axis angle approximately between 33° and 39°; and
the record carrier includes a metal evaporated film.

6. The apparatus of claim 4, in which:
the width of the gap of the write head is smaller than 0.20 μm; and
the writing means are adapted to write the digital channel signal onto the track of the record carrier with a bit-length smaller than 0.20 μm.

7. The apparatus of claim 6, in which the non-linear bit shift is less than 21%.

8. The apparatus of claim 3, further comprising the record carrier with an oblique easy-axis angle approximately between 33° and 39°.

9. The apparatus of claim 8, further comprising a record carrier with an oblique easy-axis angle of approximately 36°.

10. The apparatus of claim 8, in which the non-linear bit shift is approximately 0%.

11. The apparatus of claim 3, further comprising a record carrier including a metal evaporated film.

12. The apparatus of claim 3, in which the write means include means to write the digital channel signal into the track of the record carrier with a bit-length smaller than about 0.20 μm.

13. Apparatus of claim 1, in which time shifting transitions in a generated current are insignificant.

14. A record carrier useful in combination with the apparatus of claim 3, with an oblique easy-axis angle of approximately 36° with regard to the longitudinal direction of the track and in a plane perpendicular to the record carrier.

15. The apparatus of claim 14, further comprising a record carrier including a metal evaporated film.

16. The record carrier of claim 14 further comprising a layer of evaporated metal.

17. A record carrier useful in combination with the apparatus of claim 3, with an oblique easy-axis angle of approximately 30°–42° with regard to the longitudinal direction of the track and in a plane perpendicular to the record carrier.

* * * * *